United States Patent [19]

Mallinson et al.

[11] 3,928,697

[45] Dec. 23, 1975

[54] COATED FILMS

[75] Inventors: William John Mallinson, Colchester; Roy Frederick Huffey, Ipswich; Geoffrey Pickles Irvin, Brantham, all of England

[73] Assignee: Imperial Chemical Industries Limited, London, England

[22] Filed: Nov. 25, 1974

[21] Appl. No.: 526,925

[30] Foreign Application Priority Data

Dec. 6, 1973 United Kingdom............... 56626/73

[52] U.S. Cl. ................ 428/142; 428/148; 428/149; 428/341; 428/474; 428/480; 428/483; 428/910
[51] Int. Cl.² ........................ B32B 1/00; B32B 3/00
[58] Field of Search ........... 428/142, 148, 149, 341, 428/474, 480, 483, 910

[56] References Cited

UNITED STATES PATENTS

| 3,468,702 | 9/1969 | Gallaugher et al. ................ 428/341 |
| 3,515,626 | 6/1970 | Duffield ............................. 428/910 |

FOREIGN PATENTS OR APPLICATIONS

| 1,059,073 | 2/1967 | United Kingdom................. 428/910 |

*Primary Examiner*—William J. Van Balen
*Attorney, Agent, or Firm*—Cushman, Darby & Cushman

[57] ABSTRACT

Matt coated drafting films are treated with polymeric copolymer anti-static materials such as a copolymer of trimethyl-β-methacryloyl-oxyethyl ammonium chloride with styrene.

14 Claims, No Drawings

COATED FILMS

This invention relates to matt coated synthetic plastics films having anti-static properties and particularly to such films which are receptive to pencil and ink markings and can be used as drafting materials.

It is known to produce rough surfaced films by incorporating finely divided particulate materials into the synthetic plastics material from which the films are produced, as disclosed in British Pat. Specification No. 951,768, or by the application of a matt lacquer containing a finely divided particulate material, as disclosed in British Specification No. 1,059,073.

Many plastics films tend to accumulate electrostatic charges which may impair the handling of the films, especially when the films are cut into individual sheets since the charges may resist the separation of one sheet from the next if the sheets are stacked one on top of the other.

This invention is concerned with the use of certain anti-static materials with matt coated synthetic plastics films.

According to this invention an anti-static matt coated plastics film comprises a self-supporting synthetic plastics film base having superimposed on at least one surface of the film base an adherent matt layer comprising a finely divided particulate material and a resinous binder, an anti-static material being included in the matt layer or being included in or constituting any other layer disposed between the film base and the matt layer or superimposed on the matt layer, said anti-static material comprising a polymer or copolymer containing repeating units of the formula:

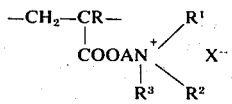

wherein R represents hydrogen or methyl, $R^1$ represents methyl or ethyl, $R^2$ and $R^3$ each independently represent methyl or ethyl or $R^2$ and $R^3$ taken together represent —$CH_2CH_2OCH_2Ch_2$— or —$(CH_2)_n$— where n represents 4, 5 or 6, A represents an alkylene or substituted alkylene group and $X^-$ represents an anion, said polymer or copolymer having an average molecular weight in the range 5,000 to 2,000,000. The coated film therefore comprises at least one layer comprising said anti-static material.

The anti-static polymer or copolymer may have a molecular weight of from 10,000 to 500,000.

Alkylene radicals which may be represented by A in the above formula include ethylene. Substituted alkylene radicals include hydroxy-substituted alkylene radicals, for example 2-hydroxytrimethylene.

Suitable anions, represented by $X^-$, may comprise halide, such as chloride or bromide; acetate; or alkylsulphate, such as ethylsulphate.

Copolymers for use according to this invention may contain at least 15% and preferably not exceeding 80% on a weight basis of repeating units of the above formula. Comonomers of the vinyl series which may be used in preparing the copolymers include styrene, methyl methacrylate, methyl acrylate, ethyl acrylate, butyl acrylate, ethylhexyl acrylate, acrylonitrile, vinyl toluene, vinyl acetate, β-ethoxyethyl methacrylate, β-hydroxyethyl methacrylate, ethylene glycol dimethacrylate, acrylamide, diacetone acrylamide, ethylene, propylene and divinyl benzene.

Useful non-quaternary units are those formed by the use of styrene, vinyl toluene, 2-ethylhexyl acrylate and methyl methacrylate. Useful anti-static materials include a homopolymer of:

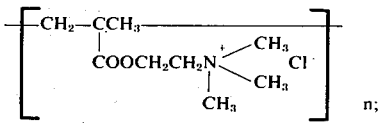

copolymers of styrene and trimethyl-β-methacryloyloxyethyl ammonium chloride, especially copolymers comprising 40 mole % and 60 mole % respectively of the two components or equimolar quantities thereof; copolymers of dimethylethyl-β-methacryloyloxyethyl ammonium ethyl-sulphate and methyl methacrylate, especially a copolymer formed from equimolar quantities of the two components; the homopolymer of dimethylethyl-β-methacryloyloxyethyl ammonium bromide; and copolymers of dimethylethyl-β-methacryloyloxyethyl ammonium bromide and methyl methacrylate, especially a copolymer formed from equimolar quantities of the two components.

The synthetic plastics film base may be formed from any suitable material, e.g. films of cellulose esters such as cellulose triacetate or diacetate, polystyrene, polyamides, polymers and copolymers of vinyl chloride, polycarbonate, polymers and copolymers of olefines such as polypropylene, and polyesters of dibasic aromatic carboxylic acids with divalent alcohols. Suitable polyester films may be produced from polyesters obtained by condensing one or more dicarboxylic acids or their lower alkyl diesters, e.g. terephthalic acid, isophthalic acid, phthalic acid, 2,5-, 2,6- and 2,7-naphthalene dicarboxylic acid, succinic acid, sebacic acid, adipic acid, azelaic acid, bibenzoic acid, and hexahydroterephthalic acid, or bis-p-carboxyl phenoxy ethane, with one or more alkylene glycols, e.g. ethylene glycol, 1,3-propanediol, 1,4-butanediol, neopentyl glycol and 1,4-cyclohexanedimethanol. The preferred film bases are polyester especially polyethylene terephthalate films.

Polyester film bases are preferably biaxially oriented and, if desired, heat set. Biaxially oriented and heat set films of polyethylene terephthalate may be produced by any process known in the art in which the film is biaxially stretch to impart molecular orientation and is dimensionally stabilised by heat setting. Such a process is disclosed in British Pat. Specification No. 838,708.

If desired, one or more intermediate adhesion promoting layers may be applied to the film surface before superimposing the matt layer.

Before the intermediate and/or matt layers are applied to the film base, it may be desirable to pretreat the film surface to promote adhesion between the two. Such a pretreatment is particularly desirable when the film support is a biaxially oriented and heat set film of polyethylene terephthalate and may involve coating the film with a material which has a swelling or solvent action on the film, for instance with a solution of a halogenated phenol, such as p-cholor-m-cresol, 2:4-dichlorophenol, 2:4:6- or 2:4:5-trichlorophenol or 4-chloro-resorcinol or a mixture of such materials, in acetone or methanol. After application of such a solution the film surface can be dried and heated at an elevated temperature for a few minutes, e.g. 2 minutes at 60° to 80°C.

As an alternative to, or in addition to, such a pretreatment, a material having a swelling or solvent action upon the film may be incorporated into the coating composition applied directly to the surface of the film base.

When the coated films of this invention are to be used as drafting materials, the film base is preferably transparent or translucent.

When an intermediate adhesion promoting layer is empolyed it may consist of any suitable plastics material such as any one of the following materials:

1. a mixed terephthalic acid-isophthalic acid copolyester with one or more alkylene glycols in which 25 to 90% of the ester groups are derived from isophthalic acid;
2. polyester amides formed from one or more dicarboxylic acids, e.g. isophthalic or terephthalic, combined with one or more alkylene glycols and an alkylene diamine, the latter comprising 5 to 30% of the total molar amount of glycols and diamine;
3. polyester oxazolines formed from one or more dicarboxylic acids, e.g. isophthalic or terephthalic, combined with one or more alkylene glycols and either 4,4-dihydroxymethyl 2-substituted oxazoline-2 or a N-aroyl or N-acyl tris-(hydroxymethyl)-amino-methane, the oxazoline-2 derivative or the derivative of tris-(hydroxymethyl)-amino-methane comprising 5 to 30% of the total molar amount of the glycol and oxazoline constituents;
4. a polymer or copolymer of a vinyl halogenoacetate, e.g. a copolymer of vinyl chloracetate and vinyl alcohol;
5. a chlorinated polyalkyl acrylate or a polyalkyl alkylmethacrylate or a chlorinated copolymer of alkyl acrylates and/or alkylmethacrylates;
6. a curable epoxy resin;
7. a copolymer of vinyl chloride and vinyl acetate, e.g. a terpolymer of vinyl chloride, vinyl acetate and vinyl alcohol (formed from 85 mole % of vinyl chloride);
8. a copolymer of vinylidene chloride, e.g. a copolymer of vinylidene chloride and acrylonitrile.

Polyester amides or polyester oxazolines under items 2) and 3) above may have acid radicals derived from isophthalic acid, terephthalic acid, or both and optionally one or more other dicarboxylic acids, e.g. phthalic, sebacic, adipic and succinic or other simple dicarboxylic acids.

Such intermediate layers may be applied by any suitable technique such as bead, dip or roller coating from a suitable solution and dried to remove the solvent. Cross-linking agents may be included in the composition from which the intermediate layer is applied to resist solvent attack during the application of subsequent layers.

The resinous binder included in the matt layer may include any suitable film forming materials such as one or more of the following: a cellulose ester, e.g. cellulose acetate propionate, cellulose nitrate; a polymer of acrylic or methacrylic acid or ester or a copolymer of such acids or esters with other ethylenically unsaturated monomers; an organic-solvent-soluble ureaformaldehyde resin; an organic-solvent-soluble melamine-formaldehyde resin; an alkyd resin; a polyvinyl acetal; a curable epoxy resin; an organic-solvent-soluble polyamide resin; a polyvinyl formal; a copolymer of vinyl formal and vinyl alcohol; or a copolymer of vinyl butyral and vinyl alcohol.

These film forming materials may be used in admixture. For example, cellulose nitrate may suitably be combined with proportions of a urea-formaldehyde or melamineformaldehyde resin, together with proportions of an alkyd resin to obtain a balance between flexibility, hardness and mar resistance; a curable epoxy resin may be suitably combined with proportions of an epoxy-reactive polyamide resin.

The finely divided particulate material incorporated in the matt layer may be of any suitable material. When the matt coated films are to be used as drafting materials the particulate material employed should impart a surface roughness to the film surface which can be marked by and will retain the impressions of writing implements such as pencils, crayons and ink.

The finely divided particulate material may be selected from silica, silicates, ground glass, chalk, talc, diatomaceous earth, magnesium carbonate, zinc oxide, zirconia, calcium carbonate and titanium dioxide. Finely divided silica of average particle size 0.1 to 15 microns is the preferred material for the production of drafting materials, together with which smaller quantities of the other materials may be incorporated, to obtain the required degree of translucency and to increase the toughness and mar resistance of the coating.

The matt layer may be applied by any suitable technique such as bead, dip or roller coating from a solution in a suitable solvent.

An ink receptive layer may be applied over the matt layer to further improve the susceptibility of the film to ink markings.

When an ink receptive layer is applied over the matt layer it may comprise any polymeric or copolymeric material which is capable of firmly retaining ink markings, such as polyvinyl butyral, a copolymer of vinyl butyral and vinyl alcohol, a phenol-formaldehyde resin, gelatin, polyvinyl alcohol, polyvinyl acetate, a urea-formaldehyde resin, a melamine-formaldehyde resin, and/or a cellulosic resin. The ink receptive layer should be thin, in the range 0.2 to 0.4 microns in thickness, so that the rough characteristics of the matt layer are not masked with the result that the receptiveness of the coated film to pencil markings is reduced. The ink receptive layer may be applied from solution by any suitable known technique.

The anti-static material may be included in any of the coating layers applied to the film base, and does not need to be in the outermost layer. Alternatively, it may be applied as a separate layer or included in a composition employed for the surface treatment of the film base, for instance it may be included in the adhesion-promoting pretreating solution, e.g. a solution of a halogenated phenol. Thus the anti-static material may be included in an adhesion-promoting layer, the matt layer or any layer applied over the matt layer such as an ink receptive layer.

It is convenient to include the anti-static material in the outermost coating layer. Thus when an ink receptive layer is applied over the matt layer, it may include the anti-static material.

Useful anti-static properties are provided when the surface concentration of the anti-static material on the final dried coated film is in the range 0.2 to 2.0 mg/dm$^2$, especially when the anti-static material is included in such amounts in an intermediate adhesionpromoting layer or in an ink receptive layer. When the anti-static material is included in the matt layer it may be present in the final dried coated film in somewhat greater amounts, e.g. from 0.6 to 7.0 mg/dm$^2$. Such coatings provide a surface resistivity at 60% relative humidity generally in the range $1 \times 10^6$ to $1 \times 10^{12}$ ohms/sq. The amount of anti-static material required in the coating composition from which the antistatic material containing layer is applied will depend on the coating technique adopted and the conditions of coating. The amounts of anti-static material to be included in the actual coating compositions to provide surface concentrations within the above range on the final coated film will be apparent to those familiar with the art.

Some commercially available anti-static materials other than those employed according to this invention tend to exhibit a yellow discolouration when incorporated into coated films of the general nature of the films of this invention and subjected to heat and ultra-violet light ageing tests. Thus anti-static materials such as 1:1-styrene maleic anhydride copolymer, polydimethylaminoethyl methacrylate hydrochloride, hexadecyltrimethyl ammonium bromide and oleamide performed poorly, particularly on heat ageing whereas the preferred anti-static materials of this invention had better resistance to heat and ultra-violet light ageing. Drafting materials made according to the invention exhibit good ink and pencil take properties. These properties are to a large extent retained after erasure and there is substantially no residual image after erasure.

The invention is further illustrated by the Examples given below. The tests used in the Examples, the results of which are given in the Tables, were as follows:

Surface resistivity:
Measured at a relative humidity of 60%. A measure of the ability to disperse charges. A low surface resistivity facilitates film handling, e.g. sheeting operations and helps to keep the films dust free during storage and use.

Charge decay:
A measure of the rate at which charges are dispersed.

Heat and ultra-violet light ageing:
Some anti-static materials are influenced and discoloured by heat and ultra-violet light and may affect the appearance and quality of the film treated with them. The ultra-violet light ageing was assessed with an instrument having a carbon arc source which was supplied by Messrs J B Marr, Strawberry Hill, Twickenham, Middlesex, England.

Ink take:
The quality of an ink line on a drafting material can be marred by spread or retraction. A good, clean edged line of high contrast is desirable.

Ink rubout:
Ink lines are often removed from drawings with a slightly moistened rubber. For some materials erasure can be untidy leaving a "tide-mark" of ink and rubber debris attached to the film around the erased area.

Ink redraw:
Repeated erasure is effected over the same area with the risk of polishing the area. Polishing tends to reduce the susceptibility to further ink markings and may lead to poor line quality.

Ink line width:
Some additives cause a retraction or even break-up of markings applied to film surfaces.

Ink adhesion:
It is important that ink lines adhere to the surface of a drafting film. A 1 cm ink square is drawn on the film surface and allowed to dry for more than 3 hours. Adhesive tape is applied over the ink and removed. The application and removal of the tape is repeated 12 times. The ink adhesion is expressed as the percentage of the ink square removed after 12 applications of the adhesive tape.

Pencil hardness:
This test, carried out with Mars "Lumograph" pencils in the range 2H to 9H, indicates the hardest pencil (i.e. finest line) that can be used on the film without damaging the coatings. Pencils are hand held at about 60° to the test surface and rotated slowly as the line is drawn.

Pencil smudge:
The appearance of drawings becomes untidy if pencil lines are easily smudged during the drawing operation or handling. Good resistance to smudging is important.

Rubs to shine:
This is a measure of the durability of the matt. Pencil lines are drawn and erased repeatedly over the same area of the film until a noticeably shiny patch is produced, which detracts from the overall good appearance of a drawing. The test records the number of erasures required to produce a shiny appearance.

Rubs to reduce take:
As a result of the repeated erasure in the manner described in the "Rubs to shine" test, the density of a pencil line applied over the shiny area may be reduced. The test records the number of erasures required to produce poor pencil line quality in a finished drawing.

EXAMPLE 1 a. A 0.003 inch thich biaxially oriented and heat set polyethylene terephthalate film was coated on one side with the following solution (i) and dried at 90°C for 3 minutes to give a dry coat weight of 3.5 mg/dm$^2$:

| Ingredient | Quantity |
| --- | --- |
| p-chloro-m-cresol | 5.0 g |
| terpolymer of vinyl chloride, vinyl acetate and vinyl alcohol (85 mole % of vinyl chloride) | 1.0 g |
| 85%/15% by volume mixture of acetone and methanol | 100 ml | b. The coated surface was then coated with the following solution to provide a matt layer:

| Ingredient | Quantity |
| --- | --- |
|  | (Parts by weight) |
| polyvinyl formal | 6.4 |
| finely divided silica particles | 2.6 |
| finely divided titanium dioxide particles | 0.12 |
| trichloroethylene | 72.48 |
| n-butyl alcohol | 10.4 |
| ethyl lactate | 8.0 |

The film was dried at 100°C for 1 minute to give a dry coat weight of 100 mg/dm$^2$.

c. The coated surfaces of three separate film samples were then coated with a composition (ii) consisting of 0.6 g polyvinyl butyral, 100 ml methanol and either 0.15, 0.30 or 0.60 g of an anti-static material consisting of a copolymer of equimolar amounts of trimethyl-β methacryloyloxyethyl ammonium chloride and styrene. The coating was dried at 90°C for 8 minutes.

d. Comparative experiments were effected to coat the surfaces of films prepared as in a) and b) above with anti-static layers, the coating compositions being the same as that for the application of the trimethyl-β methacryloyloxyethyl ammonium chloride/styrene copolymer with the exception that 0.15, 0.30 and 0.60 g of other anti-static materials were used:

A. Polydimethylaminoethyl methacrylate hydrochloride
B. Hexadecyltrimethyl ammonium bromide
C. Oleamide
D. Polyvinyl benzyltrimethyl ammonium chloride.

Another comparative experiment E was effective to coat the surfaces of films prepared as in a) and b) with a coating composition as follows:

| Ingredient | Quantity |
| --- | --- |
|  | (Parts by weight) |
| polyvinyl butyral | 0.6 |
| sulphopropylated phenol formaldehyde resin (sodium salt) | 0.11 |
| 1:1-styrene-maleic anhydride copolymer treated with aqueous caustic soda | 0.31 |
| p-toluene sulphonic acid | 0.02 |
| glyoxal | 0.12 |

The coating was dried and cured by heating at 100°C for 12 minutes.

The dry coat weights of the anti-static coatings in the experiment of the example and control experiments A to E were from 2.1 to 4.0 mg/dm$^2$.

The electrical properties, heat and ultra-violet light ageing resistance and pencil and ink take properties of the coated films were assessed with the results given in Tables 1 to 6.

TABLE 1

| Experiment | Additive | Concentration of additive in coating composition | Surface resistivity (Relative Humidity 60%) ohms/square | Charge | Heat ageing — heating at 105°C for 100 hours in air | UV light ageing — 100 hours exposure |
| --- | --- | --- | --- | --- | --- | --- |
| Example 1 | Copolymer of equimolar amounts of trimethyl-β-methacryloyloxyethyl ammonium chloride and styrene | 0.15 g<br>0.30 g<br>0.60 g | $1.3 \times 10^{10}$<br>$1.5 \times 10^{9}$<br>$2.7 \times 10^{8}$ | Rapid<br>Rapid<br>Rapid | Slight<br>Slight<br>Slight | None<br>None<br>None |

TABLE 2

| Experiment | Additive | Concentration of additive in coating composition | Surface resistivity (Relative Humidity 60%) ohms/square | Charge decay | Heat ageing — heating at 105°C for 100 hours in air | UV light ageing — 100 hours exposure |
| --- | --- | --- | --- | --- | --- | --- |
| Comparative A | Polydimethylaminoethyl methyacrylate hydrochloride | 0.15 g<br>0.30 g<br>0.60 g | $>10^{13}$<br>$4.5 \times 10^{11}$<br>$6.0 \times 10^{8}$ | —<br>Rapid<br>— | Slight<br>Definite<br>Definite | None<br>None<br>None |
| Comparative B | Hexadecyltrimethyl ammonium bromide | 0.15 g<br>0.30 g<br>0.60 g | $6.0 \times 10^{10}$<br>$5.0 \times 10^{9}$<br>$2.5 \times 10^{10}$ | Slow<br>Rapid<br>— | Slight<br>Definite<br>Considerable | None<br>None<br>None |
| Comparative C | Oleamide | 0.15 g<br>0.30 g<br>0.60 g | $>10^{13}$<br>$>10^{13}$<br>$>10^{13}$ | —<br>Very<br>— | Slight<br>Slight<br>Definite | None<br>None<br>None |
| Comparative D | Polyvinyl benzyl-trimethyl ammonium chloride | 0.15 g<br>0.30 g<br>0.60 g | $1.8 \times 10^{10}$<br>$7.0 \times 10^{9}$<br>$1.4 \times 10^{8}$ | —<br>Rapid<br>— | Slight<br>Slight<br>Slight | None<br>Slight<br>None |
| Comparative E | Mixture of (i) sulphopropylated phenol formaldehyde resin (sodium salt) and (ii) 1:1-styrene-maleic anhydride copolymer treated with aqueous caustic soda | (i) 0.11 parts<br>(ii) 0.31 parts | $2.0 \times 10^{10}$ | Rapid | Slight | Definite |

TABLE 3

Ink Take Properties
Tests effected with ink available commercially as Pelican Drawing Ink
Type 50 Special black from Gunther Wagner

| Experiment | Additive | Concentration of additive in coating composition | Take | Rub-out | Ghosting | Re-draw | Line Width mm | Adhesion |
|---|---|---|---|---|---|---|---|---|
| Example 1 | Copolymer of equimolar amounts of trimethyl-β-methacryloyloxyethyl ammonium chloride and styrene | 0.15 g | Good | Good | Slight | Good | 0.56 | 0 |
|  |  | 0.30 g | Good | Good | None | Good | 0.56 | 0 |
|  |  | 0.60 g | Good | F.Good | None | Fair | 0.55 | <5% |

TABLE 4

Ink Take Properties
Tests effected with ink available commercially as Pelican Drawing Ink
Type 50 Special black from Gunther Wagner

| Experiment | Additive | Concentration of additive in coating composition | Take | Rub-out | Ghosting | Re-draw | Line Width mm | Adhesion |
|---|---|---|---|---|---|---|---|---|
| Comparative A | Polydimethylaminoethyl methacrylate hydrochloride | 0.15 g | Good | Fair | V. Slight | F.Good | 0.55 | 0 |
|  |  | 0.30 g | F.Good | F.Good | None | Good | 0.54 | 10% |
|  |  | 0.60 g | Good | Good | None | Good | 0.55 | <5% |
| Comparative B | Hexadecyltrimethyl ammonium bromide | 0.15 g | Good | Fair | None | Good | 0.55 | 0 |
|  |  | 0.30 g | Fair | Good | None | Fair | 0.65 | 0 |
|  |  | 0.60 g | Fair | F.Good | None | Fair | 0.56 | 0 |
| Comparative C | Oleamide | 0.15 g | Good | F.Good | None | V.Good | 0.67 | 0 |
|  |  | 0.30 g | Good | Good | None | Good | 0.63 | 0 |
|  |  | 0.60 g | Good | F.Good | None | V.Good | 0.62 | 0 |
| Comparative D | Polyvinyl benzyl-trimethyl ammonium chloride | 0.15 g | Good | V.Good | None | F.Good | 0.56 | 0 |
|  |  | 0.30 g | Good | Good | None | F.Good | 0.55 | 0 |
|  |  | 0.60 g | Good | F.Good | None | F.Good | 0.51 | 0 |
| Comparative E | Mixture of (i) sulphopropylated phenol formaldehyde resin (sodium salt) and (ii) 1:1-styrene-maleic anhydride copolymer treated with aqueous caustic soda | (i) 0.11 parts (ii) 0.31 parts | Good | Good | None | Fair | 0.56 | 0 |

TABLE 5

Pencil Take Properties
Tests effected with pencils available commercially under the name Mars "Lumograph"

| Experiment | Additive | Concentration of additive in coating composition | Pencil Hardness | Take | Smudge | Rubs to shine | Rubs to Reduce take |
|---|---|---|---|---|---|---|---|
| Example 1 | Copolymer of equimolar amounts of trimethyl-β-methacryloyloxyethyl ammonium chloride and styrene | 0.15 g | 8H | Good | F.Good | 6 | >10 |
|  |  | 0.30 g | 8H | Good | Good | 5 | >10 |
|  |  | 0.60 g | 7H | Good | Good | 7 | 10 |

TABLE 6

Pencil Take Properties
Tests effected with pencils available commercially under the name Mars "Lumograph"

| Experiment | Additive | Concentration of additive in coating composition | Pencil Hardness | Take | Smudge | Rubs to shine | Rubs to Reduce take |
|---|---|---|---|---|---|---|---|
| Comparative A | Polydimethylaminoethyl methacrylate hydrochloride | 0.15 g | 8H | Good | F.Good | >10 | 10 |
|  |  | 0.30 g | 8H | Good | Good | >10 | 8 |
|  |  | 0.60 g | 9H | Good | Good | 8 | 9 |
|  | Hexadecyltrimethyl | 0.15 g | 8H | Good | Good | 10 | 7 |

TABLE 6-continued

Pencil Take Properties
Tests effected with pencils available commercially under the name Mars "Lumograph"

| Experiment | Additive | Concentration of additive in coating composition | Pencil Hardness | Take | Smudge | Rubs to shine | Rubs to Reduce take |
|---|---|---|---|---|---|---|---|
| Comparative B | ammonium bromide | 0.30 g | 9H | Good | Good | >10 | 7 |
| | | 0.60 g | 9H | Good | Fair | >10 | 7 |
| | | 0.15 g | 8H | Good | Good | 8 | 7 |
| Comparative C | Oleamide | 0.30 g | 8H | Good | Good | >10 | 8 |
| | | 0.60 g | 7H | Good | F.Good | 8 | 8 |
| | Polyvinyl benzyl- | 0.15 g | 7H | Good | F.Good | 5 | 8 |
| Comparative D | trimethyl ammonium | 0.30 g | 8H | F.Good | F.Good | 3 | >10 |
| | chloride | 0.60 g | 8H | Good | Fair | 2 | >10 |
| Comparative E | Mixture of (i) sulphopropylated phenol formaldehyde resin (sodium salt) and (ii) 1:1-styrene-maleic anhydride copolymer treated with aqueous caustic soda | (i) 0.11 parts (ii) 0.31 parts | 7H | Good | Fair | >10 | 10 |

It is seen from tables 1 to 6 that the additive according to the invention used in Example 1 possessed a combination of good electrical properties, heat and ultra-violet light ageing resistance and pencil and ink take properties whereas the films produced in the comparative examples possessed inferior properties. Thus, comparative film A had poor heat ageing performance, high surface resistivity, i.e. poor anti-static properties, at lower additive concentrations, and poor ink adhesion at higher additive concentrations. Film B exhibited poor heat ageing performance, i.e. a discoloured film of poor appearance, and rather high surface resistivity at higher concentrations of additive. Film C exhibited high surface resistivity, i.e. poor anti-static properties. Film D had poor pencil take properties as it exhibited poor smudge resistance and became shiny after few erasures, especially at higher concentrations of additive. Film E was not resistant to ultra-violet light ageing and had a rather high surface resistivity.

The product of Example 1 was suitable for use as a drafting material.

EXAMPLES 2 TO 4 a. A 0.003 inch thick biaxially oriented and heat set polyethylene terephthalate film was coated on one side with the following solution and dried at 90°C for 3 minutes to give a dry coat weight of 3.5 mg/dm²:

| Ingredient | Quantity |
|---|---|
| p-chloro-m-cresol | 5.0 g |
| polymeric anti-static material as specified in Table 7 | 0.6 g |
| terpolymer of vinyl chloride, vinyl acetate and vinyl alcohol (85 mole % of vinyl chloride) | 1.0 g |
| 78%/22% by volume mixture of acetone and methanol | 100 ml | b. The coated surface was then coated with a matt solution (iii):

| Ingredient | Quantity |
|---|---|
| | (Parts by weight) |
| polyvinyl formal | 6.4 |
| finely divided silica particles | 2.6 |
| finely divided titanium dioxide particles | 0.12 |
| trichloroethylene | 80.88 |
| methyl alcohol | 5.0 |
| diacetone alcohol | 5.0 |

The film was dried at 100°C for 1 minute to give a dry coat weight of 100 mg/dm².

c. The coated film surface was then coated with a composition consisting of 0.6 g polyvinyl butyral and 100 ml methanol. The coating was dried at 90°C for 8 minutes.

The electrical properties, heat and ultra-violet light ageing resistance and pencil and ink take properties of the coated films were assessed with the results given in Tables 7, 11 and 12. The coated films of Examples 2, 3 and 4 were suitable for use as a drafting material.

EXAMPLE 5 a. A 0.003 inch thick biaxially oriented and heat set polyethylene terephthalate film was coated on one side with the following solution and dried at 90°C for 3 minutes to give a dry coat weight of 3.5 mg/dm²:

| Ingredient | Quantity |
|---|---|
| p-chloro-m-cresol | 5.0 g |
| copolymer of equimolar amounts of ethyldimethyl-β-methacryloyloxyethyl ammonium bromide and methyl methacrylate | 0.6 g |
| terpolymer of vinyl chloride, vinyl acetate and vinyl alcohol (85 mole % of vinyl chloride) | 1.0 g |
| 78%/22% by volume mixture of acetone and methanol | 100 ml | b. The coated surface was then coated with the following solution:

| Ingredient | Quantity |
|---|---|
| | (Parts by weight) |
| cellulose acetate propionate | 7.0 |
| finely divided silica particles | 3.0 |
| finely divided titanium dioxide particles | 0.05 |
| finely divided hydrated aluminum silicate | 0.05 |
| acetone | 40.0 |
| methyl cellosolve | 40.0 |
| diacetone alcohol | 10.0 |

The film was dried at 100°C for 1 minute to give a dry coat weight of 100 mg/dm².

c. The coated surface of the above film sample was then coated with a gelatinous composition (iv) consisting of the following:

| Ingredient | Quantity |
|---|---|
| gelatin | 0.5 g |
| glacial acetic acid | 1.0 ml |
| water | 5.0 ml |
| methanol | 94.0 ml |
| 40% formaldehyde solution | 0.2 ml |

The coating was dried at 90°C for 8 minutes.

The electrical properties, heat and ultra-violet light ageing resistance and pencil and ink take properties of the coated film was assessed with the results given in Tables 8, 11 and 12. The coated film was suitable for use as a drafting material.

EXAMPLE 6 a. A 0.003 inch thick biaxially oriented and heat set polyethylene terephthalate film was coated on one side with a composition consisting of 2 g p-chloromcresol and 100 ml methanol and dried at 100°C for 1 minute.

b. The treated surface was then coated with the following solution:

| Ingredient | Quantity |
|---|---|
| copolymer of 60 mole % vinyl chloroacetate and 40 mole % vinyl alcohol | 2.0 g |
| copolymer of equimolar amounts of trimethyl-β-methacryloyloxy-ethyl ammonium chloride and styrene | 0.6 g |
| cyclohexanone | 1.5 ml |
| methyl alcohol | 98.5 ml |

The film was dried at 90°C for 1 minute to give a dry coat weight of 3.5 mg/dm².

c. The coated surface was then coated with the matt solution (iii) specified in Examples 2 to 4 and dried at 100°C for 1 minute to give a dry coat weight of 100 mg/dm².

d. The coated surface of the film was then coated with a composition consisting of 0.6 g polyvinyl butyral and 100 ml methanol. The coating was dried at 90°C for 8 minutes.

The electrical properties, heat and ultra-violet light ageing resistance and pencil and ink take properties of the coated film were assessed with the results given in Tables 8, 11 and 12. The coated film was suitable for use as a drafting material.

EXAMPLE 7 a. A 0.003 inch thick biaxially oriented and heat set polyethylene terephthalate film was coated on one side with a composition consisting of 1 g of a material commercially available as "Vitel" PE222 (a mixed terephthalic acid-isophthalic acid copolyester with an alkylene glycol) and 100 ml methanol. The coating was dried at 90°C for 3 minutes to give a dry coat weight of 3.5 mg/dm².

b. The coated surface was then coated with the following solution:

| Ingredient | Quantity |
|---|---|
| | (Parts by weight) |
| cellulose acetate propionate | 7.0 |
| poly(ethyldimethyl-β-methacryl-oyloxyethyl ammonium bromide) | 0.6 |
| finely divided silica particles | 3.0 |
| finely divided titanium dioxide particles | 0.05 |
| finely divided hydrated aluminum silicate | 0.05 |
| acetone | 40.0 |
| methyl cellosolve | 40.0 |
| diacetone alcohol | 10.0 |

The film was dried at 100°C for 1 minute to give a dry coat weight of 100 mg/dm².

c. The coated surface of the above film was then coated with the gelatinous composition (iv) specified in Example 5 and dried at 90°C for 8 minutes.

The electrical properties, heat and ultra-violet light ageing resistance and pencil and ink take properties of the coated film were assessed with the results given in Tables 8, 11 and 12. The coated film was suitable for use as a drafting material.

EXAMPLE 8 a. A 0.003 inch thick biaxially oriented and heat set polyethylene terephthalate film coated with a copolymer of vinylidene chloride and acrylonitrile was further coated with the following solution:

| Ingredient | Quantity |
|---|---|
| | (Parts by weight) |
| cellulose acetate propionate | 7.0 |
| poly(ethyldimethyl-β-methacryl-oyloxyethyl ammonium bromide) | 0.6 |
| finely divided silica particles | 3.0 |
| finely divided titanium dioxide particles | 0.05 |
| finely divided hydrated aluminum silicate | 0.05 |
| acetone | 40.0 |
| methyl cellosolve | 40.0 |
| diacetone alcohol | 10.0 |

The film was dried at 100°C for 1 minute to give a dry coat weight of 100 mg/dm².

b. The coated surface of the above sample was then coated with the gelatinous composition (iv) specified in Example 5 and was dried at 90°C for 8 minutes.

The electrical properties, heat and ultra-violet light ageing resistance and pencil and ink take properties of the coated film were assessed with the results given in Tables 8, 11 and 12. The coated film was suitable for use as a drafting material.

EXAMPLES 9 TO 13 a. A 0.003 inch thick biaxially oriented and heat set polyethylene terephthalate film was coated on one side with the solution (i) specified in Example 1 and dried at 90°C for 3 minutes to give a dry coat weight of 3.5 mg/dm$^2$.

b. The coated surface was then coated with the matt solution (iii) specified in Examples 2 to 4 and dried at 100°C for 1 minute to give a dry coat weight of 100 mg/dm$^2$.

c. The coated film was cut into five pieces and each was coated with a composition comprising:

| Ingredient | Quantity |
| --- | --- |
| polyvinyl butyral | 0.6 g |
| a polymeric anti-static material specified in Table 9 | 0.6 g |
| methanol | 100 ml |

The coating was dried at 90°C for 8 minutes.

The electrical properties, heat and ultra-violet light ageing resistance and pencil and ink take properties of the coated film were assessed with the results given in Tables 9, 11 and 12. The coated films were suitable for use as drafting materials.

EXAMPLE 14 a. A 0.003 inch thick biaxially oriented and heat set polyethylene terephthalate film coated with a copolymer of vinylidene chloride and acrylonitrile was further coated with the following solution:

| Ingredient | Quantity (Parts by weight) |
| --- | --- |
| polyvinyl butyral | 10.0 |
| finely divided silica particles | 3.5 |
| finely divided titanium dioxide particles | 0.2 |
| methyl ethyl ketone | 43.3 |
| methyl cellosolve | 35.0 |
| diacetone alcohol | 8.0 |

The film was dried at 100°C for 1 minute to give a dry coat weight of 100 mg/dm$^2$.

b. The coated surface of the above film was then coated with a composition consisting of 0.6 g of a copolymer of equimolar amounts of ethyldimethyl-β-methacryloyloxyethyl ammonium ethylsulphate and methyl methacrylate and 100 ml methanol. The coating was dried at 90°C for 8 minutes.

The electrical properties, heat and ultra-violet light ageing resistance and pencil and ink take properties of the coated film were assessed with the results given in Tables 10, 11 and 12. The coated film was suitable for use as a drafting material.

EXAMPLE 15

Example 1 was repeated with the exception that 0.25 g of the anti-static material, i.e. a copolymer of equimolar amounts of trimethyl-β-methacryloyloxyethyl ammonium chloride and styrene, was used in the coating composition (ii).

The electrical properties, heat and ultra-violet light ageing resistance and pencil and ink take properties of the coated film were assessed with the results given in Tables 10, 11 and 12. The coated film was suitable for use as a drafting material.

EXAMPLE 16 a. A 0.003 inch thick biaxially oriented and heat set polyethylene terephthalate film was coated on one side with a composition consisting of 2 g p-chloromcresol and 100 ml methanol and dried at 100°C for 1 minute.

b. The coated surface was then coated with the following solution:

| Ingredient | Quantity |
| --- | --- |
| copolymer of 60 mole % vinyl chloroacetate and 40 mole % vinyl alcohol | 1.0 g |
| copolymer of equimolar amounts of ethyldimethyl-β-methacryloyloxyethyl ammonium bromide and methyl methacrylate | 0.6 g |
| cyclohexanone | 1.5 ml |
| methyl alcohol | 98.5 ml |

The film was dried at 90°C for 1 minute to give a dry coat weight of 3.5 mg/dm$^2$.

c. The coated surface was then coated with the following solution:

| Ingredient | Quantity (Parts by weight) |
| --- | --- |
| cellulose nitrate | 10.0 |
| finely divided silica particles | 3.5 |
| finely divided titanium dioxide particles | 0.2 |
| methanol | 68.8 |
| cyclohexanol | 8.0 |

The film was dried at 100°C for 1 minute to give a dry coat weight of 100 mg/dm$^2$.

d. The coated surface of the film was then coated with the gelatinous solution (iv) specified in Example 5 and dried at 90°C for 8 minutes.

The electrical properties, heat and ultra-violet light ageing resistance and pencil and ink take properties of the coated film were assessed with the results given in Tables 10, 11 and 12. The coated film was suitable for use as a drafting material.

TABLE 7

| Example | Anti-static material | Surface resistivity (Relative Humidity 60%) ohms/square | Charge decay (Relative Humidity 35–40%) | Heat ageing - heating at 105°C for 100 hours in air | UV light ageing - 100 hours exposure |
| --- | --- | --- | --- | --- | --- |
| 2 | Copolymer of equimolar amounts of ethyldimethyl-β-methacryloyloxyethyl ammonium ethylsulphate and methyl methacrylate | 1.5 × 10$^{11}$ | Rapid | Slight | None |
| 3 | Poly(ethyldimethyl-β-methacryloyl- | | | | |

TABLE 7-continued

| Example | Anti-static material | Surface resistivity (Relative Humidity 60%) ohms/square | Charge decay (Relative Humidity 35–40%) | Heat ageing - heating at 105°C for 100 hours in air | UV light ageing - 100 hours exposure |
|---|---|---|---|---|---|
| | oxyethyl ammonium bromide) | $2 \times 10^{10}$ | Rapid | Slight | None |
| 4 | Copolymer of equimolar amounts of trimethyl-β-methacryloyloxyethyl ammonium chloride and styrene | $2.0 \times 10^{10}$ | Rapid | Slight | None |

TABLE 8

| Example | Anti-static material | Surface resistivity (Relative Humidity 60%) ohms/square | Charge decay (Relative Humidity 35–40%) | Heat ageing - heating at 105°C for 100 hours in air | UV light ageing - 100 hours exposure |
|---|---|---|---|---|---|
| 5 | Copolymer of equimolar amounts of ethyldimethyl-β-methacryloyloxyethyl ammonium bromide and methyl methacrylate | $4.0 \times 10^{10}$ | Rapid | Slight | None |
| 6 | Copolymer of equimolar amounts of trimethyl-β-methacryloyloxyethyl ammonium chloride and styrene | $6.5 \times 10^{11}$ | 20 sec. | Slight | None |
| 7 | Poly(ethyldimethyl-β-methacryloyloxyethyl ammonium bromide) | $1.5 \times 10^{11}$ | Rapid | Slight | None |
| 8 | Poly(ethyldimethyl-β-methacryloyloxyethyl ammonium bromide | $1.5 \times 10^{10}$ | Rapid | Slight | None |

TABLE 9

| Example | Anti-static material | Surface resistivity (Relative Humidity 60%) ohms/square | Charge decay (Relative Humidity 35–40%) | Heat ageing - heating at 105°C for 100 hours in air | UV light ageing - 100 hours exposure |
|---|---|---|---|---|---|
| 9 | Poly(trimethyl-β-methacryloyloxyethyl ammonium chloride) | $1.0 \times 10^{11}$ | Rapid | Slight | None |
| 10 | Copolymer of 60 mole % trimethyl-β-methacryloyloxyethyl ammonium chloride and 40 mole % styrene | $3.2 \times 10^{9}$ | Rapid | Slight | None |
| 11 | Copolymer of equimolar amounts of ethyldimethyl-β-methacryloyloxyethyl ammonium ethylsulphate and methyl methacrylate | $7.5 \times 10^{11}$ | Rapid | Slight | None |
| 12 | Poly(ethylmethyl-β-methacryloyloxyethyl ammonium bromide) | $2.5 \times 10^{9}$ | Rapid | Slight | None |
| 13 | Copolymer of equimolar amounts of ethyldimethyl-β-methacryloyloxyethyl ammonium bromide and methyl methacrylate | $2.0 \times 10^{10}$ | Rapid | Slight | None |

TABLE 10

| Example | Anti-static material | Surface resistivity (Relative Humidity 60%) ohms/square | Charge decay (Relative Humidity 35–40%) | Heat ageing - heating at 105°C for 100 hours in air | UV light ageing - 100 hours exposure |
|---|---|---|---|---|---|
| 14 | Copolymer of equimolar amounts of ethyldimethyl-β-methacryloyloxyethyl ammonium ethylsulphate and methyl methacrylate | $1.5 \times 10^{10}$ | 2 sec. | Slight | None |
| 15 | Copolymer of equimolar amount of trimethyl-β-methacryloyloxymethyl ammonium chloride and styrene | $1.5 \times 10^{9}$ | Rapid | Slight | None |
| 16 | Copolymer of equimolar amounts of ethyldimethyl-β-methacryloyloxyethyl ammonium bromide and methyl methacrylate | $7.5 \times 10^{10}$ | Rapid | Slight | None |

TABLE 11

Ink Take Properties
Tests effected with ink available commercially as Pelican Drawing Ink Type 50 Special black from Gunther Wagner

| Example | Take | Rub-out | Ghosting | Re-draw | Line Width mm | Adhesion |
|---|---|---|---|---|---|---|
| 2 | Good | Good | None | Fair | 0.55 | 0 |
| 3 | Good | Good | Slight | Good | 0.56 | 15 |
| 4 | Good | Good | V.Slight | Good | 0.59 | 0 |
| 5 | Good | Good | None | Fair | 0.57 | 30 |
| 6 | Good | Good | None | Good | 0.54 | 0 |
| 7 | Good | Fair | V.Slight | Good | 0.56 | 5 |
| 8 | Good | V.Good | None | Good | 0.55 | <5 |
| 9 | Good | Fair | Slight | Good | 0.56 | 0 |
| 10 | Good | Fair | V.Slight | Good | 0.57 | 0 |
| 11 | Good | Fair | V.Slight | Good | 0.56 | 0 |
| 12 | Good | Good | None | Good | 0.55 | 0 |
| 13 | Good | Good | V.Slight | Good | 0.57 | 0 |
| 14 | Good | V.Good | None | Good | 0.56 | 0 |
| 15 | Good | Good | None | Good | 0.57 | 0 |
| 16 | Good | Good | None | Good | 0.54 | 0 |

TABLE 12

Pencil Take Properties
Tests effected with pencils available commercially under the name Mars "Lumograph"

| Example | Pencil Hardness | Take | Smudge | Rubs to shine | Rubs to reduce take |
|---|---|---|---|---|---|
| 2 | 9H | Good | Fair | >10 | >10 |
| 3 | 9H | Good | Good | 8 | >10 |
| 4 | 6H | Good | Good | >10 | >10 |
| 5 | 9H | Good | Good | 6 | >10 |
| 6 | 8H | Good | Fair | 10 | >10 |
| 7 | 7H | Fair | Good | 10 | 10 |
| 8 | 9H | Good | V.Good | 10 | >10 |
| 9 | 8H | Good | F.Good | 6 | >10 |
| 10 | 8H | Good | F.Good | 6 | >10 |
| 11 | 8H | Good | F.Good | 6 | >10 |
| 12 | 8H | Good | F.Good | 6 | >10 |
| 13 | 8H | Good | F.Good | 6 | >10 |
| 14 | 7H | Fair | Good | 10 | 10 |
| 15 | 8H | Good | F.Good | 6 | >10 |
| 16 | 8H | Good | Fair | 10 | >10 |

V = Very
F = Fairly

We claim:

1. An anti-static matt coated plastics film which comprises a self-supporting synthetic plastics film base having superimposed on at least one surface of the film base an adherent matt layer comprising a finely divided particulate material and a resinous binder, wherein the coated film has at least one coating layer comprising an anti-static material, said anti-static material comprising a polymer or copolymer containing repeating units of the formula:

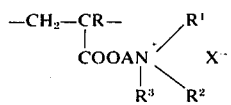

wherein R represents hydrogen or methyl, $R^1$ represents methyl or ethyl, $R^2$ and $R^3$ each independently represent methyl or ethyl or $R^2$ and $R^3$ taken together represent —$CH_2CH_2OCH_2CH_2$— or —$(CH_2)_n$— where n represents 4, 5 or 6, A represents an alkylene or substituted alkylene group and $X^-$ represents an anion, said polymer or copolymer having an average molecular weight in the range 5,000 to 2,000,000.

2. An anti-static film according to claim 1, in which the anti-static copolymer comprises a homopolymer of:

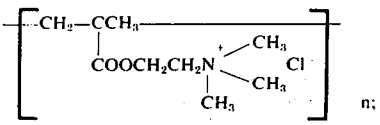

a copolymer of 40 mole % styrene and 60 mole % trimethyl-β-methacryloyloxyethyl ammonium chloride; a copolymer of equimolar quantities of dimethylethyl-β-methacryloyloxyethyl ammonium ethylsulphate and methyl methacrylate; the homopolymer of dimethylethyl-β-methacryloyloxyethyl ammonium bromide; or a copolymer of equimolar quantities of dimethylethyl-β-methacryloyloxyethyl ammonium bromide and methyl methacrylate.

3. An anti-static film according to claim 1, in which the synthetic plastics film base is a film of polyethylene terephthalate.

4. An anti-static film according to claim 1, in which an intermediate adhesion-promoting layer is disposed between the plastics film base and the matt layer, the anti-static material being included in the intermediate adhesion-promoting layer in an amount in the range from 0.2 to 2.0 mg/dm².

5. An anti-static film according to claim 4, in which the intermediate adhesion-promoting layer comprises:
   a. a mixed terephthalic acid-isophthalic acid copolyester with one or more alkylene glycols in which 25 to 90% of the ester groups are derived from isophthalic acid;
   b. a copolymer of a vinyl halogenoacetate;
   c. a terpolymer of vinyl chloride, vinyl acetate and vinyl alcohol; or
   d. a copolymer of vinylidene chloride and acrylonitrile.

6. an anti-static film according to claim 1, in which the resinous binder of the matt layer comprises:
   a. cellulose acetate propionate;
   b. a copolymer of vinyl formal and vinyl alcohol;
   c. a copolymer of vinyl butyral and vinyl alcohol; or
   d. cellulose nitrate.

7. An anti-static film according to claim 1, in which the anti-static material is included in the matt layer in amounts from 0.6 to 7.0 mg/dm².

8. An anti-static film according to claim 1, in which the matt layer has superimposed upon it an ink receptive layer.

9. An anti-static film according to claim 1, in which an ink receptive layer is superimposed upon the matt layer and contains an anti-static material in amounts from 0.2 to 2.0 mg/dm².

10. An anti-static film according to claim 8, in which the ink receptive layer comprises:
   a. a copolymer of vinyl butyral and vinyl alcohol; or
   b. gelatin.

11. An anti-static film according to claim 1, in which the anti-static material is a copolymer containing from 15 to 80% by weight of repeating units having the formula specified in claim 1.

12. An anti-static film according to claim 11, in which the anti-static material is a copolymer formed with comonomers comprising styrene, vinyl toluene, 2-ethylhexyl acrylate or methyl methacrylate.

13. An anti-static film according to claim 1, in which the anti-static material is a copolymer of equimolar amounts of trimethyl-β-methacryloyloxyethyl ammonium chloride and styrene.

14. An anti-static film according to claim 1, in which the anti-static material is included in the outermost coating layer.

* * * * *